(12) United States Patent
Shen et al.

(10) Patent No.: US 10,715,589 B2
(45) Date of Patent: Jul. 14, 2020

(54) DATA STREAM DISTRIBUTION METHOD AND APPARATUS

(71) Applicant: Huawei Technologies Co., Ltd., Shenzhen (CN)

(72) Inventors: Yingyan Shen, Shenzhen (CN); Jidong Zhang, Shanghai (CN); Jiangping Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 15/489,456

(22) Filed: Apr. 17, 2017

(65) Prior Publication Data

US 2017/0223098 A1    Aug. 3, 2017

Related U.S. Application Data

(63) Continuation of application No. PCT/CN2014/088785, filed on Oct. 17, 2014.

(51) Int. Cl.
*H04L 29/08*    (2006.01)

(52) U.S. Cl.
CPC .............................. *H04L 67/1023* (2013.01)

(58) Field of Classification Search
None
See application file for complete search history.

(56) References Cited

U.S. PATENT DOCUMENTS

| 6,836,462 B1 | 12/2004 | Albert et al. | |
| 6,944,162 B1 | 9/2005 | Hill et al. | |
| 7,443,796 B1 * | 10/2008 | Albert | H04L 29/06 370/235 |
| 7,774,484 B1 * | 8/2010 | Masters | H04L 67/1002 709/223 |
| 8,804,736 B1 * | 8/2014 | Drake | H04L 12/462 370/392 |
| 2006/0212873 A1 * | 9/2006 | Takahisa | G06F 9/5083 718/105 |
| 2008/0112326 A1 * | 5/2008 | Krishnakumar | H04L 45/02 370/238 |

(Continued)

FOREIGN PATENT DOCUMENTS

| CN | 102255816 A | 11/2011 |
| CN | 102769575 A | 11/2012 |

(Continued)

*Primary Examiner* — Andrew C Oh
(74) *Attorney, Agent, or Firm* — Leydig, Voit & Mayer, Ltd.

(57) ABSTRACT

The present invention discloses a data stream distribution method and apparatus. In the method, a load balancer may access data in a data stream according to an instruction in a distribution rule that is sent by an application server according to an interface protocol or configured on the load balancer according to an interface protocol; determine, according to a keyword generated according to the accessed data, an application server that processes the data stream; and send the data stream to the determined application server. Therefore, the load balancer may access the data in the data stream according to an instruction in a common distribution rule, to distribute the data stream, thereby reducing complexity of data stream distribution performed by the load balancer.

18 Claims, 2 Drawing Sheets

(56) References Cited

U.S. PATENT DOCUMENTS

| | | | |
|---|---|---|---|
| 2008/0170575 A1 | 7/2008 | Czuchry | |
| 2008/0275943 A1 | 11/2008 | Grayson et al. | |
| 2010/0088417 A1 | 4/2010 | Amemiya et al. | |
| 2010/0223394 A1* | 9/2010 | Sherer | H04L 29/06027 709/231 |
| 2010/0313205 A1* | 12/2010 | Shao | H04L 41/142 718/105 |
| 2011/0010298 A1* | 1/2011 | Robert | G06Q 10/06 705/59 |
| 2011/0161657 A1* | 6/2011 | So | H04L 29/12207 713/153 |
| 2012/0230194 A1* | 9/2012 | Matthews | H04L 45/7453 370/235 |
| 2012/0287946 A1* | 11/2012 | Matthews | H04L 45/24 370/474 |
| 2013/0276070 A1* | 10/2013 | Lee | G06F 21/31 726/4 |
| 2014/0006578 A1* | 1/2014 | Kohn | H04L 67/1027 709/223 |
| 2014/0122698 A1 | 5/2014 | Batrouni et al. | |
| 2015/0049764 A1 | 2/2015 | Hieda et al. | |
| 2015/0058913 A1* | 2/2015 | Kandasamy | H04L 63/061 726/1 |
| 2015/0092557 A1* | 4/2015 | Deshmukh | H04L 47/125 370/235 |
| 2015/0124652 A1* | 5/2015 | Dharmapurikar | G11C 15/04 370/255 |
| 2015/0180771 A1* | 6/2015 | Ashwood-Smith | H04L 45/72 370/230 |
| 2015/0207741 A1* | 7/2015 | Luo | H04L 45/52 370/235 |
| 2015/0295853 A1* | 10/2015 | Pell | G06F 9/5077 709/226 |
| 2015/0296002 A1* | 10/2015 | Pell | G06F 9/505 709/226 |
| 2015/0296006 A1* | 10/2015 | Pell | G06F 9/5077 709/226 |
| 2015/0378743 A1* | 12/2015 | Zellermayer | G06F 9/50 713/2 |
| 2016/0011569 A1* | 1/2016 | Schultz | H02J 3/46 700/287 |

FOREIGN PATENT DOCUMENTS

| | | |
|---|---|---|
| CN | 102882939 A | 1/2013 |
| CN | 102970242 A | 3/2013 |
| JP | 2002185525 A | 6/2002 |
| JP | 2010108479 A | 5/2010 |
| JP | 2014165743 A | 9/2014 |
| WO | 2013147175 A1 | 10/2013 |

* cited by examiner

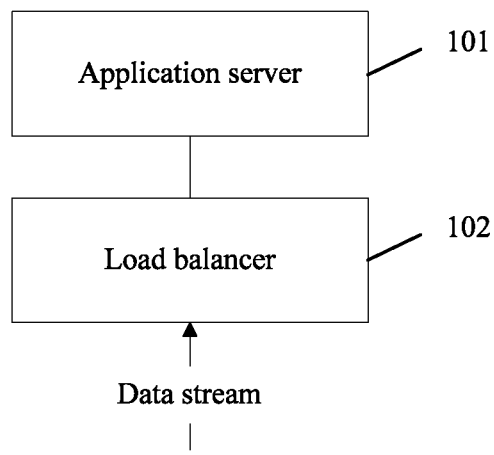

FIG. 1

```
┌─────────────────────────────────────────────────────────────┐
│         A load balancer receives a data stream              │
└─────────────────────────────────────────────────────────────┘
                              │
┌─────────────────────────────────────────────────────────────┐
│ The load balancer accesses first data in the data stream    │
│ according to a first distribution rule, generates a keyword │
│ according to the accessed first data in the data stream,    │
│ queries first distribution information according to the    │
│ keyword, and determines, according to the first            │
│ distribution information, an application server that       │
│ processes the data stream. The first distribution rule     │
│ and the first distribution information are generated by    │
│ the application server according to an interface protocol  │
│ and sent to the load balancer, or the first distribution   │
│ rule and the first distribution information are configured │
│ on the load balancer according to an interface protocol    │
└─────────────────────────────────────────────────────────────┘
                              │
┌─────────────────────────────────────────────────────────────┐
│ The load balancer sends the data stream to the determined   │
│                 application server                          │
└─────────────────────────────────────────────────────────────┘
```

FIG. 2

DATA STREAM DISTRIBUTION METHOD AND APPARATUS

CROSS-REFERENCE TO RELATED APPLICATIONS

This application is a continuation of International Application No. PCT/CN2014/088785, filed on Oct. 17, 2014, the disclosure of which is hereby incorporated by reference in its entirety.

TECHNICAL FIELD

Embodiments of the present invention relate to the communications field, and in particular, to a data stream distribution method and apparatus.

BACKGROUND

A data stream includes protocols at multiple layers. A current data stream distribution method is generally: A load balancer receives a data stream; parses the received data stream to obtain protocol data, which is generally a destination IP address, three-tuple information, five-tuple information, or the like of the data steam; distributes the data stream according to the obtained protocol data in the data stream; and sends data streams with same protocol data in a hash or polling manner to an application server for processing.

According to a data stream distribution method provided in the prior art, a load balancer needs to parse a data stream to obtain a specific protocol, so as to distribute the data stream. Due to diversified and complex interface protocols, the load balancer needs to parse data streams corresponding to various interface protocols, leading to more complex data stream distribution processing performed by the load balancer.

SUMMARY

Embodiments of the present disclosure provide a data stream distribution method and apparatus, so as to reduce complexity of data stream distribution performed by a load balancer.

According to a first aspect, a data stream distribution method is provided, including: A load balancer receives a data stream. The load balancer accesses first data in the data stream according to a first distribution rule, generates a keyword according to the accessed first data in the data stream, queries first distribution information according to the keyword, and determines, according to the first distribution information, an application server that processes the data stream, where the first distribution rule and the first distribution information are generated by the application server according to an interface protocol and sent to the load balancer, or the first distribution rule and the first distribution information are configured on the load balancer according to an interface protocol. The load balancer sends the data stream to the determined application server.

With reference to the first aspect, in a first possible implementation manner, the first data is specified data that is accessed by the load balancer according to the first distribution rule; or the first data is begin data, offset data, and length data in the data stream that are accessed by the load balancer according to the first distribution rule; or the first data is begin data, offset data, length data, and mask data in the data stream that are accessed by the load balancer according to the first distribution rule.

With reference to the first aspect and the first possible implementation manner of the first aspect, in a second possible implementation manner, the first distribution rule includes instruction information that is used to instruct the load balancer to access the first data in the data stream, generate the keyword according to the accessed first data in the data stream, and query the first distribution information according to the keyword.

With reference to any one of the first aspect, or the first or the second possible implementation manner of the first aspect, in a third possible implementation manner, the first distribution information includes a correspondence between the keyword generated according to first data of the interface protocol and information about the application server that processes the data stream. That the load balancer queries first distribution information according to the keyword, and determines, according to the first distribution information, an application server that processes the data stream includes:

The load balancer obtains, according to the keyword and the correspondence between the keyword generated according to the first data of the interface protocol and the information about the application server that processes the data stream, the information about the application server that processes the data stream; and determines the application server that processes the data stream.

With reference to any one of the first aspect, or the first to the third possible implementation manners of the first aspect, in a fourth possible implementation manner, the first distribution information includes a correspondence between the keyword generated according to first data of the interface protocol and a second distribution rule. That the load balancer queries first distribution information according to the keyword, and determines, according to the first distribution information, an application server that processes the data stream includes: The load balancer determines the second distribution rule according to the keyword and the correspondence between the keyword generated according to the first data of the interface protocol and the second distribution rule; and determines, according to the second distribution rule, the application server that processes the data stream.

With reference to the fourth possible implementation manner of the first aspect, in a fifth possible implementation manner, the second distribution rule includes instruction information that is used to instruct the load balancer to access second data in the data stream, generate a keyword according to the accessed second data in the data stream, and query second distribution information according to the keyword.

With reference to the fifth possible implementation manner of the first aspect, in a sixth possible implementation manner, the second distribution information includes a correspondence between the keyword generated according to second data of an interface protocol and information about the application server that processes the data stream. That the load balancer queries second distribution information according to the keyword, and determines, according to the second distribution information, the application server that processes the data stream includes: The load balancer obtains, according to the keyword and the correspondence between the keyword generated according to the second data of the interface protocol and the information about the application server that processes the data stream, the information about the application server that processes the data stream; and determines the application server that processes the data stream.

With reference to the fifth or the sixth possible implementation manner of the first aspect, in a seventh possible implementation manner, the first data and the second data are data of protocols at different layers in the data stream, and a protocol layer at which the second data is located is higher than a protocol layer at which the first data is located; or the first data and the second data are different data of protocols at a same layer in the data stream.

With reference to any one of the first aspect, or the first to the seventh possible implementation manners of the first aspect, in an eighth implementation manner, the load balancer obtains stream characteristic information of the data stream; and the load balancer determines the first distribution rule for the data stream according to a correspondence between the stream characteristic information of the data stream and the first distribution rule.

According to a second aspect, a data stream distribution apparatus is provided, including: a receiving unit, configured to receive a data stream; a processing unit, configured to access first data in the data stream according to a first distribution rule, generate a keyword according to the accessed first data in the data stream, query first distribution information according to the keyword, and determine, according to the first distribution information, an application server that processes the data stream, where the first distribution rule and the first distribution information are generated by the application server according to an interface protocol and sent to the apparatus, or the first distribution rule and the first distribution information are configured on the load balancer according to an interface protocol; and a sending unit, configured to send the data stream to the determined application server.

With reference to the second aspect, in a first possible implementation manner, the first data is specified data that is accessed by the load balancer according to the first distribution rule; or the first data is begin data, offset data, and length data in the data stream that are accessed by the load balancer according to the first distribution rule; or the first data is begin data, offset data, length data, and mask data in the data stream that are accessed by the load balancer according to the first distribution rule.

With reference to the second aspect and the first possible implementation manner of the second aspect, in a second possible implementation manner, the first distribution rule includes instruction information that is used to instruct the load balancer to access the first data in the data stream, generate the keyword according to the accessed first data in the data stream, and query the first distribution information according to the keyword.

With reference to any one of the second aspect, or the first or the second possible implementation manner of the second aspect, in a third possible implementation manner, the first distribution information includes a correspondence between the keyword generated according to first data of the interface protocol and information about the application server that processes the data stream. That the processing unit is configured to query first distribution information according to the keyword, and determine, according to the first distribution information, an application server that processes the data stream includes: The processing unit is configured to obtain, according to the keyword and the correspondence between the keyword generated according to the first data of the interface protocol and the information about the application server that processes the data stream, the information about the application server that processes the data stream; and determine the application server that processes the data stream.

With reference to any one of the second aspect, or the first to the third possible implementation manners of the second aspect, in a fourth possible implementation manner, the first distribution information includes a correspondence between the keyword generated according to first data of the interface protocol and a second distribution rule. That the processing unit is configured to query first distribution information according to the keyword, and determine, according to the first distribution information, an application server that processes the data stream includes: The processing unit is configured to determine the second distribution rule according to the keyword and the correspondence between the keyword generated according to the first data of the interface protocol and the second distribution rule; and determine, according to the second distribution rule, the application server that processes the data stream.

With reference to the fourth possible implementation manner of the second aspect, in a fifth possible implementation manner, the second distribution rule includes instruction information that is used to instruct the apparatus to access second data in the data stream, generate a keyword according to the accessed second data in the data stream, and query second distribution information according to the keyword.

With reference to the fifth possible implementation manner of the second aspect, in a sixth possible implementation manner, the second distribution information includes a correspondence between the keyword generated according to second data of an interface protocol and information about the application server that processes the data stream.

That the processing unit queries second distribution information according to the keyword, and determines, according to the second distribution information, the application server that processes the data stream includes:

The processing unit obtains, according to the keyword and the correspondence between the keyword generated according to the second data of the interface protocol and the information about the application server that processes the data stream, the information about the application server that processes the data stream; and determines the application server that processes the data stream.

With reference to the fifth or the sixth possible implementation manner of the second aspect, in a seventh possible implementation manner, the first data and the second data are data of protocols at different layers in the data stream, and a protocol layer at which the second data is located is higher than a protocol layer at which the first data is located; or the first data and the second data are different data of protocols at a same layer in the data stream.

With reference to any one of the second aspect, or the first to the seventh possible implementation manners of the second aspect, in an eighth implementation manner, the processing unit is further configured to obtain stream characteristic information of the data stream, and determine the first distribution rule for the data stream according to a correspondence between the stream characteristic information of the data stream and the first distribution rule.

According to a third aspect, a data stream distribution apparatus is provided, including: a receiver, configured to receive a data stream; a processor, configured to access first data in the data stream according to a first distribution rule, generate a keyword according to the accessed first data in the data stream, query first distribution information according to the keyword, and determine, according to the first distribution information, an application server that processes the data stream, where the first distribution rule and the first distribution information are generated according to an interface protocol and sent to the apparatus by the application server, or the first distribution rule and the first distribution information are configured on the apparatus according to an interface protocol; and a transmitter, configured to send the data stream to the determined application server.

With reference to the third aspect, in a first possible implementation manner, the first data is specified data that is accessed by the apparatus according to the first distribution rule; or the first data is begin data, offset data, and length data in the data stream that are accessed by the apparatus according to the first distribution rule; or the first data is begin data, offset data, length data, and mask data in the data stream that are accessed by the apparatus according to the first distribution rule.

With reference to the third aspect and the first possible implementation manner of the third aspect, in a second possible implementation manner, the first distribution rule includes instruction information that is used to instruct the apparatus to access the first data in the data stream, generate the keyword according to the accessed first data in the data stream, and query the first distribution information according to the keyword.

With reference to any one of the third aspect, or the first or the second possible implementation manner of the third aspect, in a third possible implementation manner, the first distribution information includes a correspondence between the keyword generated according to first data of the interface protocol and information about the application server that processes the data stream. That the processor is configured to query first distribution information according to the keyword, and determine, according to the first distribution information, an application server that processes the data stream includes: The processor is configured to obtain, according to the keyword and the correspondence between the keyword generated according to the first data of the interface protocol and the information about the application server that processes the data stream, the information about the application server that processes the data stream; and determine the application server that processes the data stream.

With reference to any one of the third aspect, or the first to the third possible implementation manners of the third aspect, in a fourth possible implementation manner, the first distribution information includes a correspondence between the keyword generated according to first data of the interface protocol and a second distribution rule. That the processor is configured to query first distribution information according to the keyword, and determine, according to the first distribution information, an application server that processes the data stream includes: The processor is configured to determine the second distribution rule according to the keyword and the correspondence between the keyword generated according to the first data of the interface protocol and the second distribution rule; and determine, according to the second distribution rule, the application server that processes the data stream.

With reference to the fourth possible implementation manner of the third aspect, in a fifth possible implementation manner, the second distribution rule includes instruction information that is used to instruct the apparatus to access second data in the data stream, generate a keyword according to the accessed second data in the data stream, and query second distribution information according to the keyword.

With reference to the fifth possible implementation manner of the third aspect, in a sixth possible implementation manner, the second distribution information includes a correspondence between the keyword generated according to second data of an interface protocol and information about the application server that processes the data stream. That the processor queries second distribution information according to the keyword, and determines, according to the second distribution information, the application server that processes the data stream includes: The processor obtains, according to the keyword and the correspondence between the keyword generated according to the second data of the interface protocol and the information about the application server that processes the data stream, the information about the application server that processes the data stream; and determines the application server that processes the data stream.

With reference to the fifth or the sixth possible implementation manner of the third aspect, in a seventh possible implementation manner, the first data and the second data are data of protocols at different layers in the data stream, and a protocol layer at which the second data is located is higher than a protocol layer at which the first data is located; or the first data and the second data are different data of protocols at a same layer in the data stream.

With reference to any one of the third aspect, or the first to the seventh possible implementation manners of the third aspect, in an eighth implementation manner, the processor is further configured to obtain stream characteristic information of the data stream, and determine the first distribution rule for the data stream according to a correspondence between the stream characteristic information of the data stream and the first distribution rule.

Therefore, with reference to the technical solutions provided in the embodiments of the present disclosure, a load balancer may access data in a data stream according to an instruction in a distribution rule that is sent by an application server according to an interface protocol or configured on the load balancer according to an interface protocol; determine, according to a keyword generated according to the accessed data, an application server that processes the data stream; and send the data stream to the determined application server. Therefore, the load balancer may access the data in the data stream according to an instruction in a common distribution rule, to distribute the data stream, thereby reducing complexity of data stream distribution performed by the load balancer.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 1 shows an architectural diagram of a network according to an embodiment of the present disclosure;

FIG. 2 shows a schematic flowchart of a data stream distribution method according to an embodiment of the present disclosure;

DESCRIPTION OF EMBODIMENTS

Figure 3:
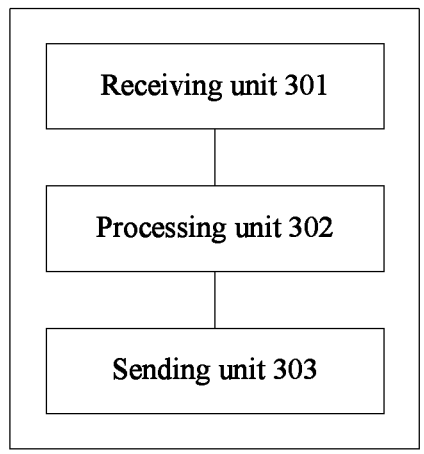
FIG. 3 shows a schematic block diagram of a data stream distribution apparatus according to an embodiment of the present disclosure.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as: a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short) system, a Universal Mobile Telecommunications System ("UMTS" for short), or a Worldwide Interoperability for Microwave Access ("WiMAX" for short) communications system.

FIG. 1 shows an architectural diagram of a network in an application scenario according to an embodiment of the present disclosure. As shown in FIG. 1, a load balancer 102 is a device that uses various distribution algorithms to distribute network requests to various available application servers, so that a network user obtains an optimal network experience as possible. Generally, the load balancer has different forms, and may be an independent load balancer or integrated into another communications device, so that the network requests are distributed to various application servers. The load balancer may be generally connected to multiple application servers. An application server 101 is generally a server that is configured to process multiple different network requests. The application server may exist independently or may be a node (such as a Gateway GPRS Support Node or Serving GPRS SUPPORT NODE) that is in a communications device and that processes different requests and performs load balancing internally.

FIG. 2 shows a schematic flowchart of a data stream distribution method according to an embodiment of the present disclosure. The method may be executed by a load balancer, which is not limited in the present disclosure. As shown in FIG. 2, the method includes the following steps:

S201. The load balancer receives a data stream.

S202. The load balancer accesses first data in the data stream according to a first distribution rule, generates a keyword according to the accessed first data in the data stream, queries first distribution information according to the keyword, and determines, according to the first distribution information, an application server that processes the data stream. The first distribution rule and the first distribution information are generated according to an interface protocol and sent to the load balancer by the application server, or the first distribution rule and the first distribution information are configured on the load balancer according to an interface protocol.

S203. The load balancer sends the data stream to the determined application server.

Generally, the application server has one or more service interfaces, and one interface generally corresponds to protocols of multiple layers. For example, the corresponding protocols include the Internet Protocol (IP for short), the corresponding protocols may further include the Transmission Control Protocol (TCP for short), the User Datagram Protocol (UDP for short), or the Stream Control Transmission Protocol (SCTP for short). Further, the corresponding protocols may also include an application layer protocol. A protocol corresponding to an interface (an interface protocol for short) is related to a specific interface.

The application server may generate a distribution rule and distribution information according to data of an interface protocol. Specifically, the application server may generate one type of distribution rule and distribution information according to data of one type of interface protocol, and send the distribution rule and the distribution information to the load balancer, so that the load balancer is instructed to distribute a data stream according to specific protocol data in the data stream. Therefore, the load balancer may parse current increasingly diversified and complex protocol types according to an instruction, and accurately distribute a corresponding data stream, thereby enhancing a load balancing capability of the load balancer, and reducing complexity of parsing various data streams corresponding to various interface protocols by the load balancer. Similarly, the distribution rule and the distribution information may be configured on the load balancer according to the data of the interface protocol.

Therefore, based on the technical solution provided in this embodiment of the present disclosure, a load balancer may access data in a data stream according to an instruction in a distribution rule that is sent by an application server according to an interface protocol or configured on the load balancer according to an interface protocol; determine, according to a keyword generated according to the accessed data, an application server that processes the data stream; and send the data stream to the determined application server. Therefore, the load balancer may access the data in the data stream according to an instruction in a common distribution rule, to distribute the data stream, thereby reducing complexity of data stream distribution performed by the load balancer.

After receiving the data stream, the load balancer obtains stream characteristic information of the data stream. The stream characteristic information is information that can be used to identify the data stream. For example, the stream characteristic information of the data stream may be a source IP address, a destination IP address, three-tuple information, or five-tuple information in the data stream, which is not limited in the present disclosure.

The load balancer obtains the stream characteristic information of the data stream, and determines the first distribution rule for the data stream according to the stream characteristic information of the data stream. There is a correspondence between the distribution rule and the stream characteristic information of the data stream. The load balancer may determine the first distribution rule for the data stream according to the stream characteristic information of the data stream.

A distribution rule includes instruction information that is used to instruct the load balancer to access data in a data stream, generate a keyword according to the data in the data stream, and query distribution information according to the keyword. That is, the first distribution rule includes instruction information that is used to instruct the load balancer to access the first data in the data stream, generate the keyword according to the accessed first data in the data stream, and query the first distribution information according to the keyword.

There are mainly the following manners of accessing data in a data stream by the load balancer according to an instruction in a distribution rule: 1. The load balancer accesses specified data in the data stream according to the instruction in the distribution rule. For example, the load balancer accesses data such as an IP address or a port number of the data stream according to the instruction in the distribution rule. 2. The load balancer accesses begin (Begin) data, offset (Offset) data, and length (Length) data in the data stream, or begin (Begin) data, offset (Offset) data, length (Length) data, and mask (Mask) data in the data stream according to the instruction in the distribution rule. Therefore, the load balancer accesses the first data in the data stream according to the first distribution rule. The first data is specified data that is accessed by the load balancer according to an instruction in the first distribution rule, or the first data is begin data, offset data, and length data in the data stream that are accessed by the load balancer according to the instruction in the first distribution rule, or begin data, offset data, length data, and mask data in the data stream that are accessed by the load balancer according to the instruction in the first distribution rule. The load balancer accesses the data in the data stream according to the instruction in the distribution rule, generates the keyword according to the accessed data, and queries the first distribution information according to the generated keyword, to determine the application server that processes the data stream. That the load balancer generates the keyword according to the accessed data in the data stream may be specifically: The load balancer uses one or more pieces of accessed data in the data stream to generate the keyword by means of an operation according to a defined algorithm. The algorithm used to generate the keyword may include multiple types of conventional algorithms. For example, an operation such as OR, AND, addition, or subtraction is performed. For example, the load balancer accesses data in a data stream according to instruction information in a distribution rule. For example, a field 1 and a field 2 in the data stream are accessed, and an algorithm used to generate a keyword may be an addition (+) operation, that is, the keyword is Field 1+Field 2.

Therefore, based on the technical solution provided in this embodiment of the present disclosure, a load balancer may flexibly access data in a data stream according to an instruction in a distribution rule that is sent by an application server or configured on the load balancer, generate a keyword according to the accessed data, and determine distribution information, to determine an application server that processes the data stream.

The load balancer accesses the data in the data stream according to the distribution rule, generates the keyword according to the accessed data in the data stream, queries the distribution information according to the generated keyword, and determines, according to the distribution information, the application server that processes the data stream. The distribution information may be configured on the load balancer according to an interface protocol, or generated according to an interface protocol and sent to the load balancer by the application server, which is not limited in the present disclosure. The distribution information includes a correspondence between a keyword generated according to data of the interface protocol and information about the application server that processes the data stream.

After generating the keyword according to the accessed data in the data stream, the load balancer may determine, according to the correspondence between the keyword generated according to the data of the interface protocol and the information about the application server that processes the data stream, the application server that processes the data stream. In this case, the distribution information is a correspondence between a keyword generated according to data of an interface protocol and information about an application server that processes a data stream. The load balancer may query, according to a keyword generated according to accessed data in the data stream, a correspondence corresponding to the keyword generated according to the accessed data in the data stream, in the foregoing distribution information (multiple correspondences between keywords generated according to data of interface protocols and information about application servers that process data streams). That is, the first distribution information may include a correspondence between the keyword generated according to first data of the interface protocol and the information about the application server that processes the data stream. That the load balancer queries first distribution information according to the keyword, and determines, according to the first distribution information, an application server that processes the data stream includes: The load balancer obtains, according to the keyword and the correspondence between the keyword generated according to the first data of the interface protocol and the information about the application server that processes the data stream, the information about the application server that processes the data stream; and determines the application server that processes the data stream. Therefore, based on the technical solution provided in this embodiment of the present disclosure, a load balancer may access data in a data stream according to an instruction in a common distribution rule, determine, according to a keyword generated according to the accessed data, an application server that processes the data stream, and send the data stream to the determined application server. Therefore, the load balancer may distribute the data stream according to the common distribution rule, thereby reducing complexity of data stream distribution performed by the load balancer.

In another embodiment of the present disclosure, a load balancer accesses first data in a data stream according to an instruction in a first distribution rule, generates a keyword according to the accessed first data, and queries first distribution information according to the keyword. The first distribution information includes a correspondence between a keyword generated according to first data of an interface protocol and a second distribution rule. The second distribution rule includes instruction information that is used to instruct the load balancer to access second data in the data stream, generate a keyword according to the accessed second data in the data stream, and query second distribution information according to the keyword. The second distribution information includes a correspondence between the keyword generated according to second data of an interface protocol and information about an application server that processes the data stream. That the load balancer queries second distribution information according to the keyword, and determines, according to the second distribution information, the application server that processes the data stream includes: The load balancer obtains, according to the keyword and the correspondence between the keyword generated according to the second data of the interface protocol and the information about the application server that processes the data stream, the information about the application server that processes the data stream; and determines the application server that processes the data stream. Therefore, another distribution rule is nested in distribution information, and other data in the data stream is accessed according to an instruction in the another distribution rule, so that other distribution information is queried according to a keyword generated according to the other data, and an application server that processes the data stream is determined. Therefore, the load balancer may access more detailed data in the data stream according to a specific situation of an interface protocol, to distribute the data stream to the corresponding application server, thereby enhancing a load balancing capability of the load balancer.

Specifically, the first data and the second data are data of protocols at different layers in the data stream, and a protocol layer at which the second data is located is higher than a protocol layer at which the first data is located (for example, the first data is data of the Transmission Layer Control Protocol in the data stream, and the second data is data of the application layer protocol); or the first data and the second data are different data of protocols at a same layer in the data stream (for example, the first data is three-tuple information in the data stream, and the second data is five-tuple information in the data stream). That is, the application server generates a specific distribution rule and distribution information according to a situation of an interface protocol.

For example, after receiving a data stream, the load balancer determines a first distribution rule for the data stream according to stream characteristic information of the data stream; accesses five-tuple information in the data stream according to an instruction in the first distribution rule; obtains first distribution information by means of querying according to a keyword generated according to the five-tuple information; obtains a second distribution rule according to a correspondence that is between the keyword and the second distribution rule and that is included in the first distribution information; accesses seven-tuple information in the data stream according to an instruction in the second distribution rule; generates a keyword according to the seven-tuple information; and obtains second distribution information by means of querying, so as to determine an application server that processes the data stream, according to a correspondence that is between the keyword generated according to the seven-tuple information and information about the application server that processes the data stream and that is included in the second distribution information.

Therefore, based on the technical solution provided in this embodiment of the present disclosure, a load balancer may access data in a data stream according to an instruction in a common distribution rule, determine, according to a keyword generated according to the accessed data, an application server that processes the data stream, and send the data stream to the determined application server. Therefore, the load balancer may distribute the data stream according to the common distribution rule, thereby reducing complexity of data stream distribution performed by the load balancer. In addition, another distribution rule is nested in distribution information, and an application server that processes the data stream is determined according to an instruction in the another distribution rule, so that the load balancer may access more detailed data in the data stream according to a specific situation of an interface protocol, to distribute the data stream to the corresponding application server, thereby enhancing a load balancing capability of the load balancer.

The following is a specific embodiment of disclosure the data stream distribution method provided in FIG. 2. The method may be executed by a load balancer, which is not limited in the present disclosure.

Firstly, the load balancer receives a data stream and determines a distribution rule for the data stream.

Generally, the distribution rule may be sent by an application server to the load balancer, or the distribution rule is configured on the load balancer. The distribution rule may be generated according to data of an interface protocol and sent to the load balancer by the application server, or the distribution rule is configured on the load balancer according to data of an interface protocol.

There is a correspondence between the distribution rule (distribution rule 1) and stream characteristic information of the data stream. The stream characteristic information is information that can be used to identify the data stream, and may be generally an IP address, three-tuple information, five-tuple information, or the like, which is not limited in the present disclosure. The distribution rule includes instruction information. The instruction information is used to instruct the load balancer to access data in the data stream, generate a keyword according to the accessed data, and determine, according to the generated keyword, an application server that processes the data stream. Specifically, distribution information may be queried according to the generated keyword. The distribution information includes a correspondence between a keyword generated according to data of an interface protocol and information about the application server that processes the data stream. If there is a correspondence between the keyword that is generated according to the data of the interface protocol and that is included in the distribution information, and the keyword generated by the load balancer according to the accessed data, the load balancer can therefore determine the distribution information for the data stream. The distribution information includes the correspondence between the keyword generated according to the data of the interface protocol and the information about the application server that processes the data stream, and the load balancer may obtain the information about the application server that processes the data stream, according to the instruction information, the generated keyword, and the correspondence between the keyword and the information about the application server that processes the data stream; and determine the application server that processes the data stream. If the distribution information includes a correspondence between the keyword and another distribution rule (distribution rule 2), the load balancer may determine the another distribution rule according to the instruction information, the generated keyword, and the correspondence between the keyword and the another distribution rule, so as to determine, according to the another distribution rule, the application server that processes the data stream (for a process, reference may be made to a related process in which the application server that processes the data stream is determined according to the distribution rule 1).

Secondly, the load balancer determines, according to the distribution rule, an application server that processes the data stream.

Specifically, the load balancer accesses data in the data stream according to instruction information in the distribution rule 1. There are mainly the following manners of accessing the data in the data stream:

1. The load balancer accesses specified data in the data stream according to the instruction information in the distribution rule. For example, a source IP address, a destination IP address, three-tuple information, five-tuple information, seven-tuple information, or the like in the data stream is accessed.

2. The load balancer accesses begin (Begin) data, offset (Offset) data, and length (Length) data in the data stream, or begin (Begin) data, offset (Offset) data, length (Length) data, and mask (Mask) data in the data stream according to the instruction information in the distribution rule.

For example, the following data is accessed: Begin: IP payload Begin
OffSet: AA
Length: BB
Mask:

Optionally, the instruction information in the distribution rule may be used to instruct the load balancer to access one or more pieces of data in the data stream. Further, the instruction information in the distribution rule is used to instruct the load balancer to generate a keyword according to the accessed data. An algorithm used to generate the keyword may include multiple types of conventional algorithms. For example, an operation such as OR, AND, addition, subtraction, greater than, less than, equal to, or not equal to is performed. For example, the load balancer accesses a field 1 and a field 2 in protocol data in a data stream according to instruction information in a distribution rule, and an algorithm used to generate a keyword may be an addition (+) operation, that is, the keyword is Field 1+Field 2.

Further, the load balancer determines distribution information according to the keyword, according the instruction information in the distribution rule. There are two manners of determining the distribution information according to the keyword:

1. The distribution information includes a correspondence between a keyword generated according to data of an interface protocol and information about an application server, or a correspondence between a keyword generated according to data of an interface protocol and another distribution rule, and the load balancer may determine the distribution information according to the keyword and the foregoing correspondence.

2. The load balancer compares the keyword with a preset value according to the instruction information in the distribution rule; and if the keyword and the preset value are the same, determines that the distribution information is distribution information A; or if the keyword and the preset value are different, determines that the distribution information is distribution information B.

Further, the load balancer determines the application server according to the instruction information in the distribution rule. If the determined distribution information includes the information about the application server that processes the data stream, the load balancer may determine, according to the obtained information about the application server that processes the data stream, the application server that processes the data stream. For example, the load balancer receives a data stream and obtains stream characteristic information of the data stream, where the stream characteristic information may be a source IP address of the data stream. The load balancer determines a distribution rule for the data stream according to the stream characteristic information of the data stream, where the distribution rule includes instruction information that is used to instruct the load balancer to access three-tuple information in the data stream, generate a keyword according to the three-tuple information, and determine distribution information according to the keyword. According to the instruction information in the distribution rule, the load balancer accesses the three-tuple information in the data stream, generates the keyword according to the three-tuple information, and determines the distribution information according to the keyword, where the distribution information includes the keyword generated according to the three tuples and information about an application server that processes the data stream. The load balancer may determine, according to the distribution information, the application server that processes the data stream. Therefore, based on this embodiment of the present disclosure, a load balancer may access data in a data stream according to instruction information in a distribution rule that is sent by an application server or a configured distribution rule configured on the load balancer, and determine an application server that processes the data stream, thereby reducing complexity of data stream distribution performed by the load balancer, and achieving a load balancing effect.

Optionally, the load balancer determines a distribution rule according to stream characteristic information of the data stream, and determines distribution information according to the distribution rule. The determined distribution information includes another distribution rule. The load balancer determines another piece of distribution information according to the another distribution rule, to determine the application server that processes the data stream. For example, the load balancer receives a data stream; obtains stream characteristic information of the data stream, where the stream characteristic information may be three-tuple information in the data stream; and determines a distribution rule 1 for the data stream according to the three-tuple information in the data stream. The load balancer accesses data in the data stream according to instruction information in the distribution rule 1, where the accessed data may be five-tuple information in the data stream; generates a keyword according to the accessed five-tuple information in the data stream; and determines distribution information 1 according to the keyword, where the distribution information 1 includes a keyword generated according to five-tuple information in data of an interface protocol and a distribution rule 2. The load balancer determines the distribution rule 2 for the data stream according to a correspondence between the keyword generated according to the five-tuple information in the data of the interface protocol and the distribution rule 2. The distribution rule 2 includes instruction information that is used to instruct the load balancer to access seven-tuple information in the data stream (or TCP protocol data, GDP protocol data, or the like in the data stream) and determine the distribution information 2 according to the accessed seven-tuple information. The distribution information 2 includes a correspondence between a keyword generated according to seven-tuple information in data of an interface protocol and an application server that processes the data stream. The load balancer may determine, according to the distribution information 2, the application server that processes the data stream, and distribute the data stream to the application server for processing. Therefore, based on the method provided in this embodiment of the present disclosure, another distribution rule is nested in a distribution rule, so that a load balancer is instructed to access data in a data stream. The load balancer may access more detailed data in the data stream. The load balancer may access the more detailed data in the data stream according to a specific situation of an interface protocol, and accurately distribute, according to the accessed data, the data stream to a corresponding application server for processing, thereby enhancing a load balancing capability of the load balancer.

FIG. 3 shows a schematic block diagram of a data stream distribution apparatus according to an embodiment of the present disclosure. The apparatus may be the load balancer in the foregoing embodiment, which is not limited in the present disclosure. The apparatus may be configured to execute the data stream distribution method provided in the foregoing embodiment. Mutual reference may be made between this embodiment and the foregoing embodiment.

A receiving unit 301 is configured to receive a data stream.

A processing unit 302 is configured to access first data in the data stream according to a first distribution rule, generate a keyword according to the accessed first data in the data stream, query first distribution information according to the keyword, and determine, according to the first distribution information, an application server that processes the data stream. The first distribution rule and the first distribution information are generated according to an interface protocol and sent to the apparatus by the application server, or the first distribution rule and the first distribution information are configured on the apparatus according to an interface protocol.

A sending unit 303 is configured to send the data stream to the determined application server.

Therefore, based on the technical solution provided in this embodiment of the present disclosure, a load balancer may access data in a data stream according to an instruction in a distribution rule that is sent by an application server according to an interface protocol or configured on the load balancer according to an interface protocol; determine, according to a keyword generated according to the accessed data, an application server that processes the data stream; and send the data stream to the determined application server. Therefore, the load balancer may access the data in the data stream according to an instruction in a common distribution rule, to distribute the data stream, thereby reducing complexity of data stream distribution performed by the load balancer.

Specifically, the first data is specified data that is accessed by the apparatus according to the first distribution rule; or the first data is begin data, offset data, and length data in the data stream that are accessed by the load balancer according to the first distribution rule; or the first data is begin data, offset data, length data, and mask data in the data stream that are accessed by the load balancer according to the first distribution rule. When accessing data in a data stream, the processing unit 302 may access specified data in the data stream, or access begin data, offset data, and length data in the data stream, or access begin data, offset data, length data, and mask data in the data stream, according to an instruction in a distribution rule. Therefore, the load balancer accesses related data in the data stream according to instruction information in the distribution rule that is sent by the application server or configured on the load balancer, so that the load balancer may parse current increasingly complex and diversified interface protocols, thereby reducing complexity of data stream parsing and distribution performed by the load balancer.

Further, the first distribution rule includes instruction information that is used to instruct the load balancer to access the first data in the data stream, generate the keyword according to the accessed first data in the data stream, and query the first distribution information according to the keyword.

In the data stream distribution apparatus provided in this embodiment of the present disclosure, the first distribution information includes a correspondence between the keyword generated according to first data of the interface protocol and information about the application server that processes the data stream. That the processing unit 302 is configured to query first distribution information according to the keyword, and determine, according to the first distribution information, an application server that processes the data stream includes: The processing unit 302 is configured to obtain, according to the keyword and the correspondence between the keyword generated according to the first data of the interface protocol and the information about the application server that processes the data stream, the information about the application server that processes the data stream; and determine the application server that processes the data stream.

Therefore, based on the data stream distribution apparatus provided in this embodiment of the present disclosure, the apparatus may flexibly access data in a data stream according to an instruction in a distribution rule that is sent by an application server or configured on the apparatus, and determine distribution information according to a keyword generated according to the accessed data, so as to determine an application server that processes the data stream.

In another data stream distribution apparatus provided in this embodiment of the present disclosure, the first distribution information includes a correspondence between the keyword generated according to first data of the interface protocol and a second distribution rule. That the processing unit 302 is configured to query first distribution information according to the keyword, and determine, according to the first distribution information, an application server that processes the data stream includes: The processing unit 302 is configured to determine the second distribution rule according to the keyword and the correspondence between the keyword generated according to the first data of the interface protocol and the second distribution rule; and determine, according to the second distribution rule, the application server that processes the data stream. Specifically, the second distribution rule includes instruction information that is used to instruct the apparatus to access second data in the data stream, generate a keyword according to the accessed second data in the data stream, and query second distribution information according to the keyword. The second distribution information includes a correspondence between the keyword generated according to second data of an interface protocol and information about the application server that processes the data stream. That the processing unit 302 queries second distribution information according to the keyword, and determines, according to the second distribution information, the application server that processes the data stream includes: The processing unit 302 obtains, according to the keyword and the correspondence between the keyword generated according to the second data of the interface protocol and the information about the application server that processes the data stream, the information about the application server that processes the data stream; and determines the application server that processes the data stream. Therefore, based on the data stream distribution apparatus provided in this embodiment of the present disclosure, another distribution rule is nested in a distribution rule, so that the apparatus is instructed to access data in a data stream. The apparatus may access more detailed data in the data stream. The apparatus may access the more detailed data in the data stream according to a specific situation of an interface protocol, and accurately distribute, according to the accessed data, the data stream to a corresponding application server for processing, thereby enhancing a load balancing capability of the data stream distribution apparatus.

Specifically, the first data and the second data are data of protocols at different layers in the data stream, and a protocol layer at which the second data is located is higher than a protocol layer at which the first data is located; or the first data and the second data are different data of protocols at a same layer in the data stream.

Optionally, the processing unit 302 is further configured to obtain stream characteristic information of the data stream, and determine the first distribution rule for the data stream according to a correspondence between the stream characteristic information of the data stream and the first distribution rule.

Figure 4:
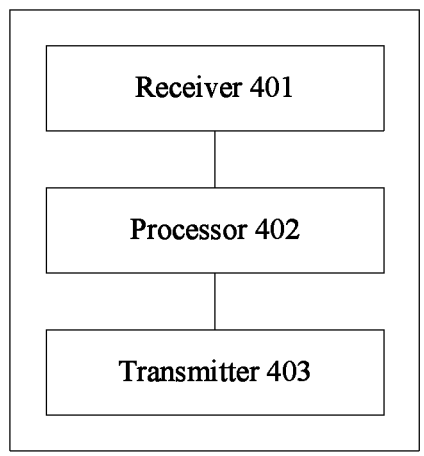
FIG. 4 shows a schematic block diagram of a data stream distribution apparatus according to an embodiment of the present disclosure.

FIG. 4 shows a schematic block diagram of a data stream distribution apparatus according to an embodiment of the present disclosure. The apparatus may be the load balancer in the foregoing embodiment, which is not limited in the present disclosure. The apparatus may execute the method in the foregoing embodiment. Mutual reference may be made between this embodiment of the present disclosure and the foregoing embodiment.

A receiver 401 is configured to receive a data stream.

A processor 402 is configured to access first data in the data stream according to a first distribution rule, generate a keyword according to the accessed first data in the data stream, query first distribution information according to the keyword, and determine, according to the first distribution information, an application server that processes the data stream. The first distribution rule and the first distribution information are generated according to an interface protocol and sent to the apparatus by the application server, or the first distribution rule and the first distribution information are configured on the apparatus according to an interface protocol.

A transmitter 403 is configured to send the data stream to the determined application server.

Therefore, based on the technical solution provided in this embodiment of the present disclosure, the apparatus may be a load balancer. The load balancer may access data in a data stream according to an instruction in a distribution rule that is sent by an application server according to an interface protocol or configured on the load balancer according to an interface protocol; determine, according to a keyword generated according to the accessed data, an application server that processes the data stream; and send the data stream to the determined application server. Therefore, the load balancer may access the data in the data stream according to an instruction in a common distribution rule, to distribute the data stream, thereby reducing complexity of data stream distribution performed by the load balancer.

Specifically, the first data is specified data that is accessed by the apparatus according to the first distribution rule; or the first data is begin data, offset data, and length data in the data stream that are accessed by the apparatus according to the first distribution rule; or the first data is begin data, offset data, length data, and mask data in the data stream that are accessed by the apparatus according to the first distribution rule. When accessing data in a data stream, the processor 402 may access specified data in the data stream, or access begin data, offset data, and length data in the data stream, or access begin data, offset data, length data, and mask data in the data stream, according to an instruction in a distribution rule. Therefore, the load balancer accesses related data in the data stream according to instruction information in the distribution rule that is sent by the application server or configured on the load balancer, so that the load balancer may parse current increasingly complex and diversified interface protocols, thereby reducing complexity of data stream parsing and distribution performed by the load balancer.

Further, the first distribution rule includes instruction information that is used to instruct the load balancer to access the first data in the data stream, generate the keyword according to the accessed first data in the data stream, and query the first distribution information according to the keyword.

In the data stream distribution apparatus provided in this embodiment of the present disclosure, the first distribution information includes a correspondence between the keyword generated according to first data of the interface protocol and information about the application server that processes the data stream. That the processor 402 is configured to query first distribution information according to the keyword, and determine, according to the first distribution information, an application server that processes the data stream includes: The processor 402 is configured to obtain, according to the keyword and the correspondence between the keyword generated according to the first data of the interface protocol and the information about the application server that processes the data stream, the information about the application server that processes the data stream; and determine the application server that processes the data stream.

Therefore, based on the data stream distribution apparatus provided in this embodiment of the present disclosure, the apparatus may flexibly access data in a data stream according to an instruction in a distribution rule that is sent by an application server or configured on the apparatus, and determine distribution information according to a keyword generated according to the accessed data, so as to determine an application server that processes the data stream.

In another data stream distribution apparatus provided in this embodiment of the present disclosure, the first distribution information includes a correspondence between the keyword generated according to first data of the interface protocol and a second distribution rule. That the processor 402 is configured to query first distribution information according to the keyword, and determine, according to the first distribution information, an application server that processes the data stream includes: The processor 402 is configured to determine the second distribution rule according to the keyword and the correspondence between the keyword generated according to the first data of the interface protocol and the second distribution rule; and determine, according to the second distribution rule, the application server that processes the data stream. Specifically, the second distribution rule includes instruction information that is used to instruct the apparatus to access second data in the data stream, generate a keyword according to the accessed second data in the data stream, and query second distribution information according to the keyword. The second distribution information includes a correspondence between the keyword generated according to second data of an interface protocol and information about the application server that processes the data stream. That the processor 402 queries second distribution information according to the keyword, and determines, according to the second distribution information, the application server that processes the data stream includes: The processor 402 obtains, according to the keyword and the correspondence between the keyword generated according to the second data of the interface protocol and the information about the application server that processes the data stream, the information about the application server that processes the data stream; and determines the application server that processes the data stream. Therefore, based on the data stream distribution apparatus provided in this embodiment of the present disclosure, another distribution rule is nested in a distribution rule, so that the apparatus is instructed to access data in a data stream. The apparatus may access more detailed data in the data stream. The apparatus may access the more detailed data in the data stream according to a specific situation of an interface protocol, and accurately distribute, according to the accessed data, the data stream to a corresponding application server for processing, thereby enhancing a load balancing capability of the data stream distribution apparatus.

Specifically, the first data and the second data are data of protocols at different layers in the data stream, and a protocol layer at which the second data is located is higher than a protocol layer at which the first data is located; or the first data and the second data are different data of protocols at a same layer in the data stream.

Optionally, the processor 402 is further configured to obtain stream characteristic information of the data stream, and determine the first distribution rule for the data stream according to a correspondence between the stream characteristic information of the data stream and the first distribution rule.

It should be understood that in the embodiment of the present disclosure, the processor may be a central processing unit ("CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may further be any conventional processor, or the like.

In an implementation process, steps in the foregoing methods can be implemented by using a hardware integrated logical circuit in the processor, or by using instructions in a form of software. The steps of the method disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data stream distribution method carried out on a load balancer according to an interface protocol, the method comprising:
   receiving a data stream;
   obtaining, by the load balancer, a stream characteristic information of the data stream;
   determining, by the load balancer, a first distribution rule according to a correspondence between the stream characteristic information and the first distribution rule;

determining, according to the first distribution rule, an application server that processes the data stream, wherein the determining the application server comprises:
   accessing, according to the instruction information in the first distribution rule, a first data in the data stream;
   generating, after the accessing and according to the instruction information, a keyword according to the first data in the data stream;
   determining a first distribution information according to the keyword;
   determining, according to the first distribution information, an application server that processes the data stream; and
sending, according to the determining the application server that processes the data stream, the data stream to the application server,
wherein the first distribution rule and the first distribution information are:
   received by the load balancer after being generated externally according to the interface protocol and sent to the load balancer, or
   configured on the load balancer according to the interface protocol.

2. The method according to claim 1, wherein the first data is specified data that is accessed by the load balancer according to the first distribution rule.

3. The method according to claim 1, wherein the first data is begin data, offset data, and length data in the data stream that are accessed by the load balancer according to the first distribution rule.

4. The method according to claim 1, wherein the first distribution rule comprises instruction information that is used to:
   instruct the load balancer to access the first data in the data stream,
   generate the keyword according to the accessed first data in the data stream, and
   determine the first distribution information according to the keyword.

5. The method according to claim 1, wherein the first distribution information comprises a correspondence between the keyword generated according to the first data of the interface protocol and information about the application server that processes the data stream; and
   wherein the determining the first distribution information according to the keyword comprises obtaining, by the load balancer according to the keyword and the correspondence between the keyword generated according to the first data of the interface protocol and the information about the application server that processes the data stream, the information about the application server that processes the data stream.

6. The method according to claim 1, wherein the first distribution information comprises a correspondence between the keyword generated according to first data of the interface protocol and a second distribution rule; and
   wherein the determining, by the load balancer, the first distribution information according to the keyword, and determining, according to the first distribution information, an application server that processes the data stream comprises:
      determining, by the load balancer, the second distribution rule according to the keyword and the correspondence between the keyword generated according to the first data of the interface protocol and the second distribution rule; and
      determining, according to the second distribution rule, the application server that processes the data stream.

7. The method according to claim 6, wherein the second distribution rule comprises instruction information that is used to:
   instruct the load balancer to access second data in the data stream,
   generate a keyword according to the accessed second data in the data stream, and
   determine a second distribution information according to the keyword.

8. The method according to claim 7, wherein the second distribution information comprises a correspondence between the keyword generated according to second data of an interface protocol and information about the application server that processes the data stream; and
   wherein the determining, by the load balancer, the second distribution information according to the keyword comprises obtaining, by the load balancer according to the keyword and the correspondence between the keyword generated according to the second data of the interface protocol and the information about the application server that processes the data stream, the information about the application server that processes the data stream.

9. The method according to claim 7, wherein the first data and the second data are data of protocols at different layers in the data stream, and a protocol layer at which the second data is located is higher than a protocol layer at which the first data is located.

10. A data stream distribution apparatus configured to carry out the data stream distribution according to an interface protocol, comprising:
   a receiver, configured to receive a data stream;
   a processor, configured with a non-transitory computer-readable medium including computer-executable instructions that, when executed by the processor, facilitate performing a method comprising:
   obtaining, by the load balancer, a stream characteristic information of the data stream;
   determining, by the load balancer, a first distribution rule according to a correspondence between the stream characteristic information and the first distribution rule;
   determining, according to the first distribution rule, an application server that processes the data stream, wherein the determining the application server comprises:
      accessing, according to the instruction information in the first distribution rule, a first data in the data stream;
      generating, after the accessing and according to the instruction information, a keyword according to the first data in the data stream;
      determining a first distribution information according to the keyword; and
      determining, according to the first distribution information, an application server that processes the data stream;
   wherein the first distribution rule and the first distribution information are:
      received by the apparatus after being generated externally according to the interface protocol and sent to the apparatus, or
      configured on the apparatus according to the interface protocol; and a sending unit, configured to send the data stream to the determined application server that processes the data stream.

11. The apparatus according to claim 10, wherein the first data is specified data that is accessed by the apparatus according to the first distribution rule.

12. The apparatus according to claim 10, wherein the first data is begin data, offset data, and length data in the data stream that are accessed by the apparatus according to the first distribution rule.

13. The apparatus according to claim 10, wherein the first distribution rule comprises instruction information that is used to:
instruct the apparatus to access the first data in the data stream,
generate the keyword according to the accessed first data in the data stream, and
determine the first distribution information according to the keyword.

14. The apparatus according to claim 10, wherein the first distribution information comprises a correspondence between the keyword generated according to first data of the interface protocol and information about the application server that processes the data stream; and
wherein the determining the first distribution information according to the keyword comprises obtaining, according to the keyword and the correspondence between the keyword generated according to the first data of the interface protocol and the information about the application server that processes the data stream, the information about the application server that processes the data stream.

15. The apparatus according to claim 10, wherein the first distribution information comprises a correspondence between the keyword generated according to first data of the interface protocol and a second distribution rule; and
wherein the determining the first distribution information according to the keyword, and determining, according to the first distribution information, an application server that processes the data stream comprises:
determining the second distribution rule according to the keyword and the correspondence between the keyword generated according to the first data of the interface protocol and the second distribution rule; and
determining, according to the second distribution rule, the application server that processes the data stream.

16. The apparatus according to claim 15, wherein the second distribution rule comprises instruction information that is used to:
instruct the apparatus to access second data in the data stream,
generate a keyword according to the accessed second data in the data stream, and
determine a second distribution information according to the keyword.

17. The apparatus according to claim 16, wherein the second distribution information comprises a correspondence between the keyword generated according to second data of an interface protocol and information about the application server that processes the data stream; and
wherein determining the second distribution information according to the keyword comprises obtaining, according to the keyword and the correspondence between the keyword generated according to the second data of the interface protocol and the information about the application server that processes the data stream, the information about the application server that processes the data stream.

18. The apparatus according to claim 16, wherein
the first data and the second data are data of protocols at different layers in the data stream, and a protocol layer at which the second data is located is higher than a protocol layer at which the first data is located.

* * * * *